United States Patent
Reddy

(10) Patent No.: US 9,281,753 B2
(45) Date of Patent: Mar. 8, 2016

(54) LLC CONVERTER WITH DYNAMIC GAIN TRANSFORMATION FOR WIDE INPUT AND OUTPUT RANGE

(75) Inventor: Raghothama Reddy, Murphy, TX (US)

(73) Assignee: General Electric Company, Schenectady, NY (US)

(*) Notice: Subject to any disclaimer, the term of this patent is extended or adjusted under 35 U.S.C. 154(b) by 257 days.

(21) Appl. No.: 13/562,943

(22) Filed: Jul. 31, 2012

(65) Prior Publication Data

US 2014/0036545 A1  Feb. 6, 2014

(51) Int. Cl.
*H02M 3/337* (2006.01)
*H02M 3/335* (2006.01)
*H02M 3/156* (2006.01)
*H02M 7/48* (2007.01)

(52) U.S. Cl.
CPC ............ *H02M 3/3376* (2013.01); *H02M 3/156* (2013.01); *H02M 3/33507* (2013.01); *H02M 2007/4815* (2013.01); *Y02B 70/1433* (2013.01); *Y02B 70/1441* (2013.01)

(58) Field of Classification Search
CPC .............. H02M 3/28; H02M 3/33507; H02M 3/33569; H02M 3/33561; H02M 3/33592; H02M 3/33576; H02M 3/156
USPC .............. 363/15, 16, 17, 21.02, 21.03, 21.04, 363/21.12
See application file for complete search history.

(56) References Cited

U.S. PATENT DOCUMENTS

| | | | |
|---|---|---|---|
| 7,768,806 B2* | 8/2010 | Lin et al. | 363/97 |
| 7,796,404 B2 | 9/2010 | Reddy | |
| 8,085,556 B2 | 12/2011 | Moussaoui | |
| 2008/0259646 A1* | 10/2008 | Moussaoui | 363/17 |
| 2009/0290385 A1* | 11/2009 | Jungreis et al. | 363/17 |
| 2010/0014321 A1* | 1/2010 | Won et al. | 363/17 |
| 2012/0020137 A1* | 1/2012 | Abe | 363/132 |
| 2013/0201726 A1* | 8/2013 | Hu et al. | 363/17 |
| 2013/0336013 A1* | 12/2013 | Mueller | 363/17 |

* cited by examiner

*Primary Examiner* — Jeffrey Gblende
(74) *Attorney, Agent, or Firm* — General Electric Company

(57) ABSTRACT

A resonant power converter system includes an output load and a rectifier stage that provides a DC output voltage to the output load from an AC intermediate voltage. The resonant power converter system also includes a resonant inverter stage that provides the AC intermediate voltage from a DC input voltage, wherein an inverter gain is controlled by switching between full-bridge and half-bridge topologies based on an external variable of the resonant power converter system. The resonant power converter system further includes a controller that controls the resonant power converter system. Additionally, a method of operating a power converter includes rectifying an AC intermediate voltage to provide a DC output voltage and providing the AC intermediate voltage by inverting a DC input voltage, wherein an inversion gain of the AC intermediate voltage is controlled by switching between full-bridge and half-bridge inversion topologies based on an external variable.

30 Claims, 11 Drawing Sheets

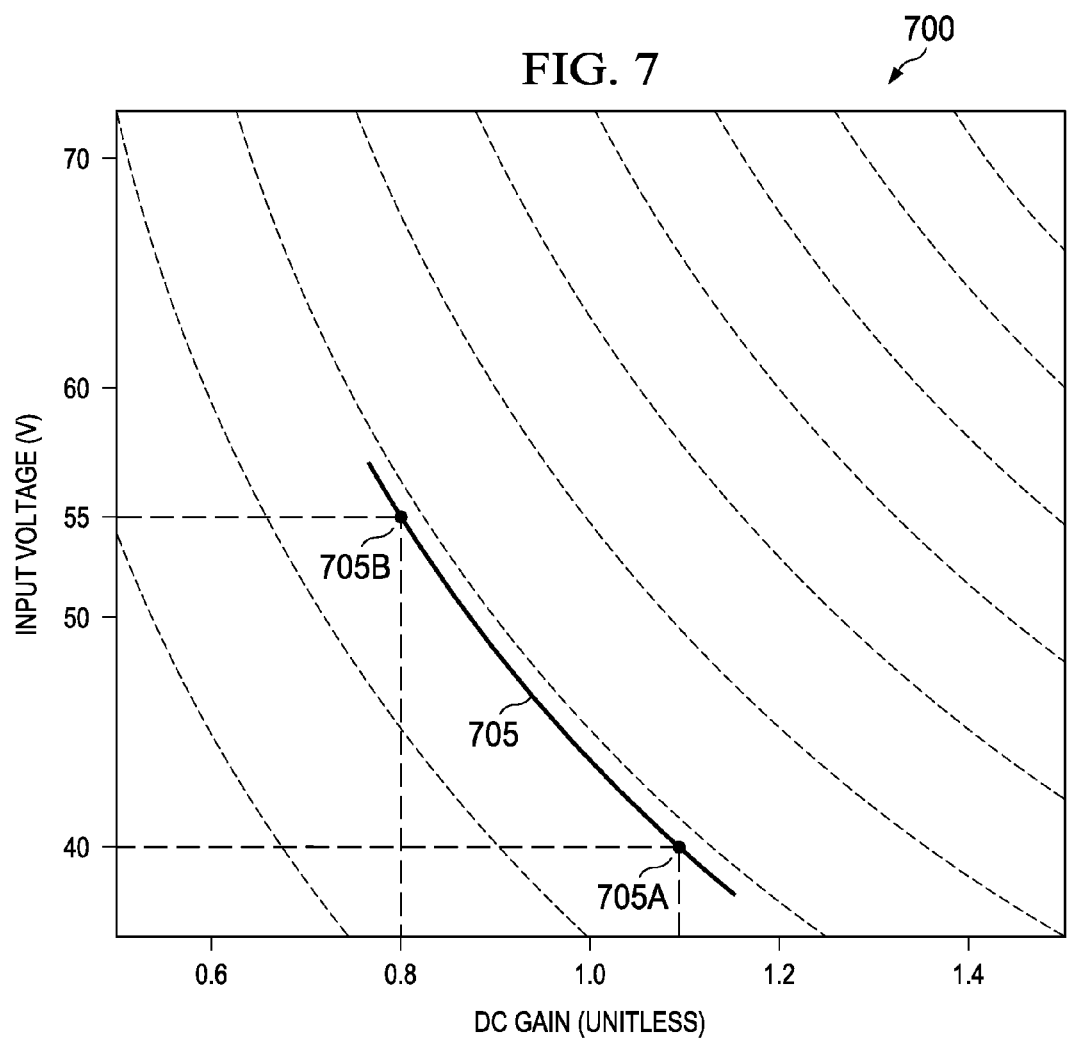

LLC CONVERTER WITH DYNAMIC GAIN TRANSFORMATION FOR WIDE INPUT AND OUTPUT RANGE

TECHNICAL FIELD

This application is directed, in general, to power conversion and, more specifically, to a power converter, a method of operating a power converter and a resonant power converter system.

BACKGROUND

There is a continuing trend in the power conversion industry to provide DC/DC converters with improved efficiency and power density characteristics. This trend is quite evident in intermediate bus architecture applications. These applications have created the need for converters providing an intermediate bus voltage, for example 12 volts, from an input voltage that may range from 36 volts to 75 volts. To satisfy this need, hard switching, pulse-width modulated, constant frequency converters have been developed. However the ever increasing efficiency requirements have pushed the limits of these topologies to the point where efficiency gains are incremental and primarily dependent upon improvements in the characteristics of the semiconductors switches. Furthermore the requirements for increasing output power have reached 600 to 800 watts, which requires higher efficiency just to keep the power supply from overheating. Therefore, what is needed in the art is a way to improve these limitations for a wider range of associated external constraints.

SUMMARY

Embodiments of the present disclosure provide a power converter, a method of operating a power converter and a resonant power converter system.

In one embodiment, the power converter includes a rectifier stage configured to provide a DC output voltage from an AC intermediate voltage. Additionally, the power converter also includes a resonant inverter stage configured to provide the AC intermediate voltage from a DC input voltage, wherein an inverter gain is controlled by switching between full-bridge and half-bridge topologies based on an external variable of the power converter.

In another aspect, the method of operating a power converter includes rectifying an AC intermediate voltage to provide a DC output voltage and providing the AC intermediate voltage by inverting a DC input voltage, wherein an inversion gain of the AC intermediate voltage is controlled by switching between full-bridge and half-bridge inversion topologies based on an external variable.

In yet another aspect, the resonant power converter system includes an output load and a rectifier stage that provides a DC output voltage to the output load from an AC intermediate voltage. The resonant power converter system also includes a resonant inverter stage that provides the AC intermediate voltage from a DC input voltage, wherein an inverter gain is controlled by switching between full-bridge and half-bridge topologies based on an external variable of the resonant power converter system. The resonant power converter system further includes a controller that controls the resonant power converter system.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which:

FIGS. 7 and 8 illustrate families of constant output voltages for embodiments of resonant power converters employing full-bridge and half-bridge topologies, respectively.

DETAILED DESCRIPTION

There is a renewed and broadened interest in resonant conversion topologies in AC/DC conversion systems due to market demands for higher efficiency and power density. Generally, resonant converters are switching converters that include a resonant circuit to process the input-to-output power flow through the converter. There are many variations of resonant converters that, in general, are based on a resonant inverter. That is, a unit that converts a DC voltage into a sinusoidal voltage (more generally, into a low harmonic content AC voltage) and provides AC power to a load.

To accomplish this, a switch network typically produces a square-wave voltage that is applied to a resonant circuit tuned to the fundamental component of the square wave. In this manner, the resonant circuit will respond primarily to the fundamental component and more negligibly to the higher order harmonics, so that its voltage or current, as well as those of the load, will be essentially sinusoidal or piecewise sinusoidal.

Although there are many variations of resonant circuits, the inductor, inductor, capacitor (LLC) resonant circuit has been adopted in many AC/DC applications. The LLC resonant circuit offers a number of advantages including the ability to provide high efficiency, the possible integration of the resonant inductors into a power magnetic device, as well as offering zero voltage switching (ZVS) of associated power switches. However, a practical operating frequency range for an LLC converter may restrict its use to applications where input and output voltage ranges are relatively narrow. Embodiments of the present disclosure overcome this limitation.

Figure 1:
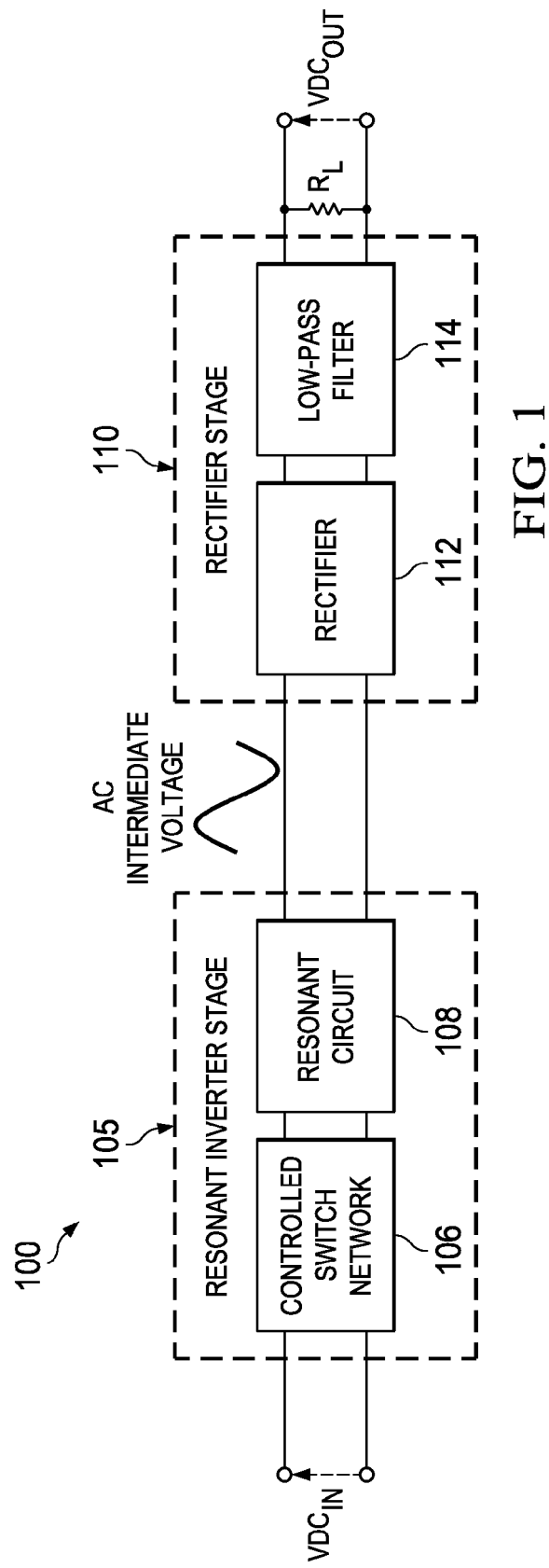
FIG. 1 illustrates a block diagram of a resonant power converter constructed according to the principles of the present disclosure.

FIG. 1 illustrates a block diagram of a resonant power converter, generally designated 100, constructed according to the principles of the present disclosure. The resonant power converter 100 includes a resonant inverter stage 105 having a controlled switch network 106 and a resonant circuit 108, and a rectifier stage 110 having a rectifier 112 and a low-pass filter 114. The controlled switch network 106 receives a DC input voltage $VDC_{IN}$ and provides a square AC waveform to the resonant circuit 108, which then provides a substantially sinusoidal AC intermediate voltage to the rectifier 112. This AC intermediate voltage is rectified by the rectifier 112, filtered by the low-pass filter 114 and provided as a DC output voltage $VDC_{OUT}$ across a load $R_L$. The controlled switch network 106, which provides the square AC waveform to the resonant circuit 108, employs half-bridge and full-bridge switching topologies. Additionally, the rectifier 112 may be a controlled or an uncontrolled rectifier.

The resonant power converter 100 may be normally operated in a region where the input impedance of the resonant circuit 108 is inductive (i.e., the input impedance increases with frequency). The resonant circuit 108 allows control of the DC output voltage $VDC_{OUT}$ by changing the frequency of the square AC waveform either closer to or further from a resonant frequency of the resonant circuit 108, while keeping its duty cycle fixed. This implies that power flow can be controlled by changing the operating frequency of the converter in such a way that a reduced power demand from the load produces a frequency increase, and an increased power demand causes a frequency decrease. Restricting the operating frequency so that the resonant circuit 108 is inductive insures that the power switches associated with the controlled switch network 106 have ZVS characteristics, which greatly reduces their losses.

Figure 2:
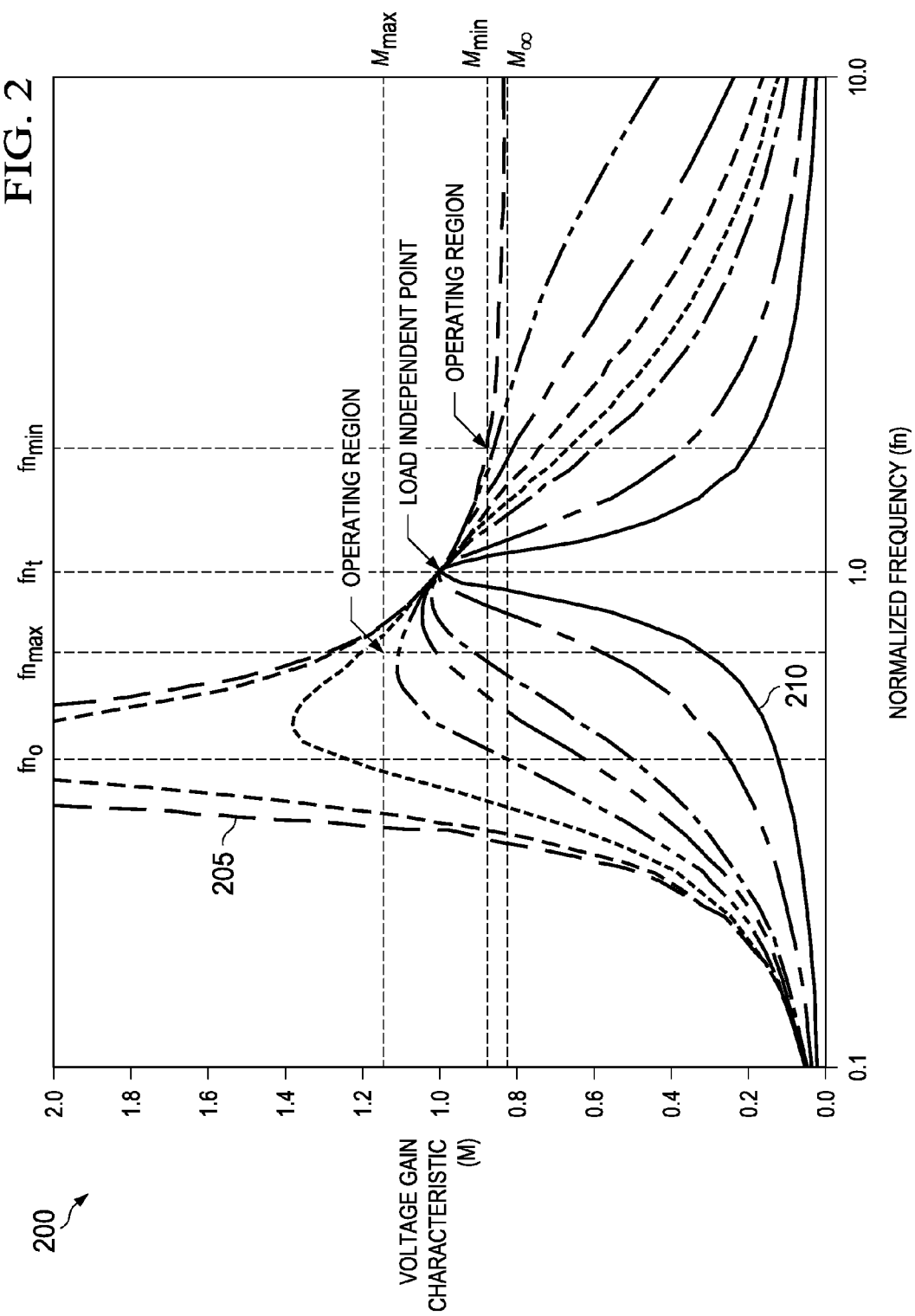
FIG. 2 illustrates a family of curves representing a voltage gain characteristic or voltage conversion ratio corresponding to the resonant inverter stage FIG. 1.

FIG. 2 illustrates a family of curves, generally designated 200, representing a voltage gain characteristic or voltage conversion ratio corresponding to the resonant inverter stage 105 of FIG. 1. The family of curves 200 illustrates operating characteristics for various output loading conditions (i.e., from a no-load curve 205 to an over load curve 210). The family of curves 200 also illustrates an example of an operating region corresponding to a minimum normalized switching frequency $fn_{min}$ and a maximum voltage gain characteristic $M_{max}$ and a maximum normalized switching frequency $fn_{max}$ and a minimum voltage gain characteristic $M_{min}$. These are selected based on design considerations and fall within a value range of 0.88 to 1.15 for the example shown in FIG. 2. Other resonant circuit designs may employ other minimum to maximum ranges. The family of curves 200 also illustrates a load independent point corresponding to a normalized switching frequency fn equal to one and a voltage gain characteristic M equal to one (i.e., point 1:1). At this point, theoretically no frequency change is required to achieve load regulation.

As indicated, regulation of a converter output voltage $VDC_{out}$ is achieved by changing the switching frequency of the square waveform at the input of the resonant circuit 108. Also, since the operating region is in an inductive part of the family of curves 200, a frequency control circuit that regulates the output voltage $VDC_{OUT}$ acts by increasing a frequency in response to either a decrease of the output power demand or to an increase of the DC input voltage $VDC_{out}$. Additionally, the DC output voltage $VDC_{out}$ can be regulated against wide load variations with a relatively narrow switching frequency change, if the converter is operated close to the load independent point. The family of curves 200 additionally indicates that the wider a DC input voltage range, the wider the operating frequency range has to be, which makes circuit optimization more difficult.

In one embodiment, the resonant power converters disclosed herein provide for a wide input voltage range by altering the resonant power converter gain by a factor of two. This is accomplished by dynamically switching the topology between a full-bridge and a half-bridge depending on a value of the DC input voltage $VDC_{in}$. Other external parameters, such as the output voltage $VDC_{out}$, may also be used to switch between controlled switch network topologies.

As an example, an input voltage range of 36 to 75 volts may be divided into two sub-ranges such that a full-bridge switch network topology is utilized when the DC input voltage $VDC_{in}$ is between 36 Vdc and 55 Vdc and a half-bridge switch network topology is used for a DC input voltage VDCin from 55 Vdc to 75 Vdc. This switching between full-bridge and half-bridge switch network topologies allow a resonant power converter to maintain the same voltage gain for the two input ranges and thereby still operate in the vicinity of its series resonance frequency.

The equations that characterize the operation of a resonant inverter stage employing an LLC resonant circuit are well known. See, for example, "Topology Investigation of Front End DC/DC Converters for Distributed Power Systems", PHD dissertation in Electrical Engineering, the Virginia Polytechnic Institute and State University by Bo Yang, which is incorporated herein by reference. The equation that defines the input voltage to output voltage conversion ratio for a half-bridge topology is given in equation (1) as:

$$Vout/Vin = \frac{1}{2}M_{fsw}. \tag{1}$$

For a full-bridge topology, the input voltage to output voltage conversion ratio is given by equation (2) as:

$$Vout/Vin = M_{fsw}. \tag{2}$$

That is, the voltage conversion ratio Vout/Vin for the half-bridge topology is equal to one half of the resonant circuit's forward transfer function M calculated at the switching frequency fsw. Therefore, the voltage conversion ratio for a full bridge topology is generally twice that of a half-bridge topology, since the overall voltage swing at the input to the resonant circuit is twice that of the half-bridge topology.

Figure 3:
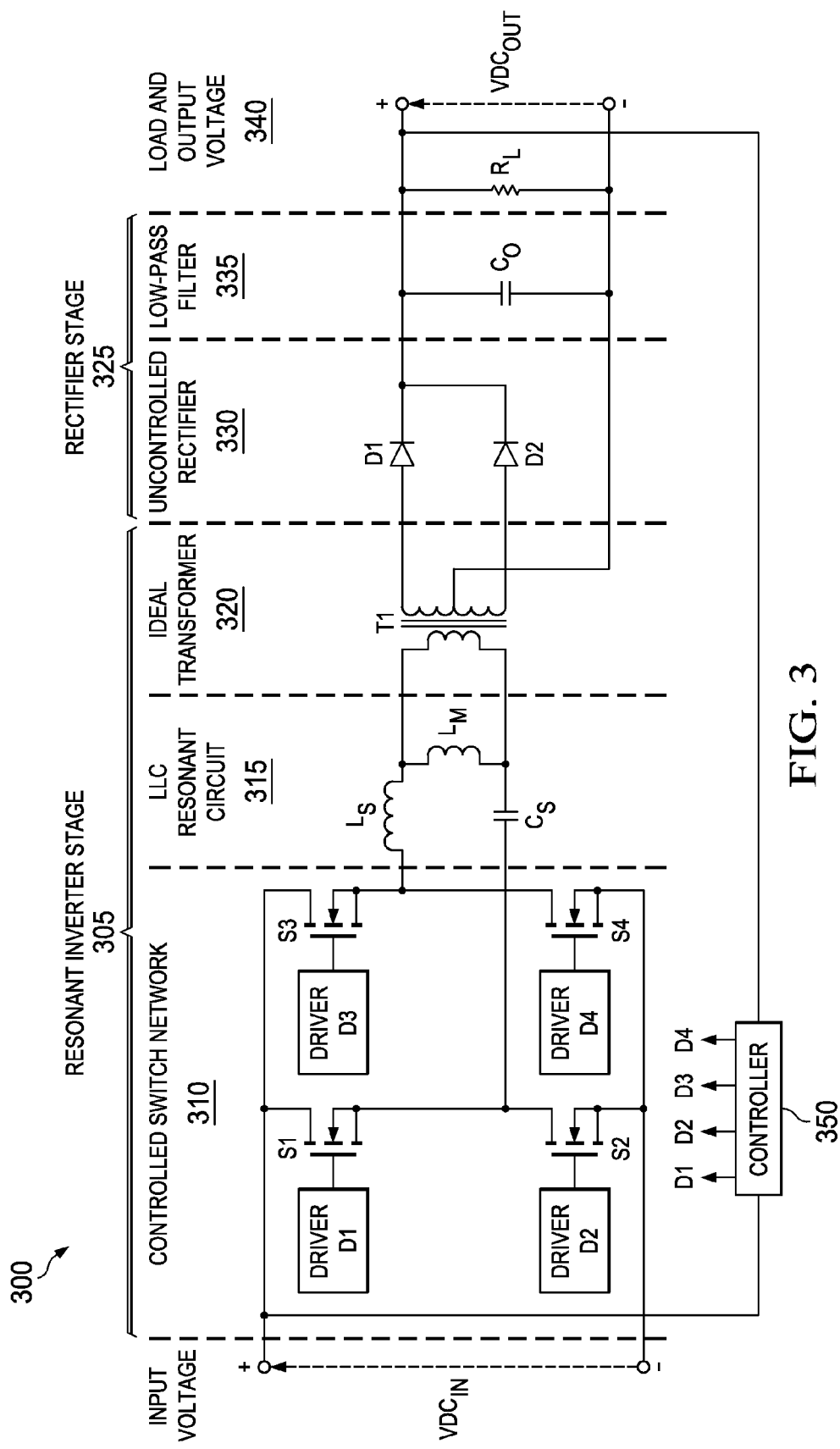
FIG. 3 illustrates a schematic diagram of a resonant power converter system constructed according to the principles of the present disclosure.

FIG. 3 illustrates a schematic diagram of a resonant power converter system, generally designated 300, constructed according to the principles of the present disclosure. The resonant power converter system 300 includes a resonant inverter stage 305, a rectifier stage 320 and a controller 350. The resonant inverter stage 305 includes a controlled switch network 310 coupled between a DC input voltage $VDC_{in}$ and an LLC resonant circuit 315 that is further coupled to a transformer 320. The rectifier stage 325 includes an uncontrolled rectifier 330 coupled between the transformer 320 and a low pass filter 325 that provides a DC output voltage $VDC_{out}$ to a load $R_L$. The controller 350 controls the operation of the resonant power converter system 300.

The controlled switch network 310 includes two pairs of power switches S1:S4 and S2:S3 that are controlled by two pairs of switch drivers D1:D4 and D2:D3 to be conductive in a mutually exclusive manner. The LLC resonant circuit 315 includes a series inductor $L_S$, a mutual inductance $L_m$ of the transformer 320 and a series capacitor $C_S$. The uncontrolled rectifier 330 includes rectifier diodes D1, D2 connected to provide rectification of an AC intermediate voltage from the transformer 320. The resonant power converter system 300 may also benefit from the use of synchronous rectifiers to provide improvements over those achieved with diode rectification. For example, techniques and methods as described in U.S. Pat. No. 7,796,404 filed by Raghothama Reddy on Oct. 23, 2008, entitled "LLC Converter Synchronous FET Controller and Method of Operation Thereof", commonly assigned with this application and incorporated herein by reference, may be applied. The low-pass filter 335 is a filter capacitor $C_O$.

Dynamically switching between a full-bridge and a half-bridge topology is accomplished with the controller 350, which determines the topology required by sensing an external variable such as the DC input voltage $VDC_{in}$ or the DC output voltage $VDC_{out}$. The controller 350 may be an embodiment employing analog, digital or combined analog/digital circuitry. The digital embodiment may utilize a digital signal processor (DSP), for example, which converts the DC input voltage $VDC_{in}$ into a digital format and then compares its value to a predetermined input voltage value.

This value may be a constant that is loaded into a memory in the DSP when programmed. Alternately, it may be a customized value used to accommodate particular characteristics on a unit-by-unit basis. The customized value may be determined during unit test and then loaded into an appropriate memory. The customized value may account for variations in the unit-to-unit characteristics, such as variations in the LLC resonant circuit 315, to produce a more optimum switching point between the two topologies. Additionally, hysteresis may be employed at a switching threshold point to insure against unwanted repetitive switching between topologies. The controller 350 may then provide appropriate timing signals to the controlled switch network 310.

Additionally, the dynamic gain switching technique discussed herein may also be applied in applications that require an intermediate bus voltage. For example, a power architecture that utilizes an intermediate bus architecture powering non-isolated point-of-load (POL) converters for RF power amplifiers in a wireless base station may have 48 volts as the intermediate bus voltage. Alternately, the POL converters may provide output voltages of 16 to 32 volts that are used by an RF final stage amplifier. The choice of intermediate bus voltage may be selected to provide the highest system efficiency consistent with input voltage requirements of the POL converters. Using a resonant power converter system, as discussed herein, provides a regulated intermediate bus voltage as well as galvanic isolation between the input and RF amplifier loads. Furthermore, the soft-switching and low noise characteristics of resonant mode converters are valuable in applications powering RF equipment.

Figure 4:
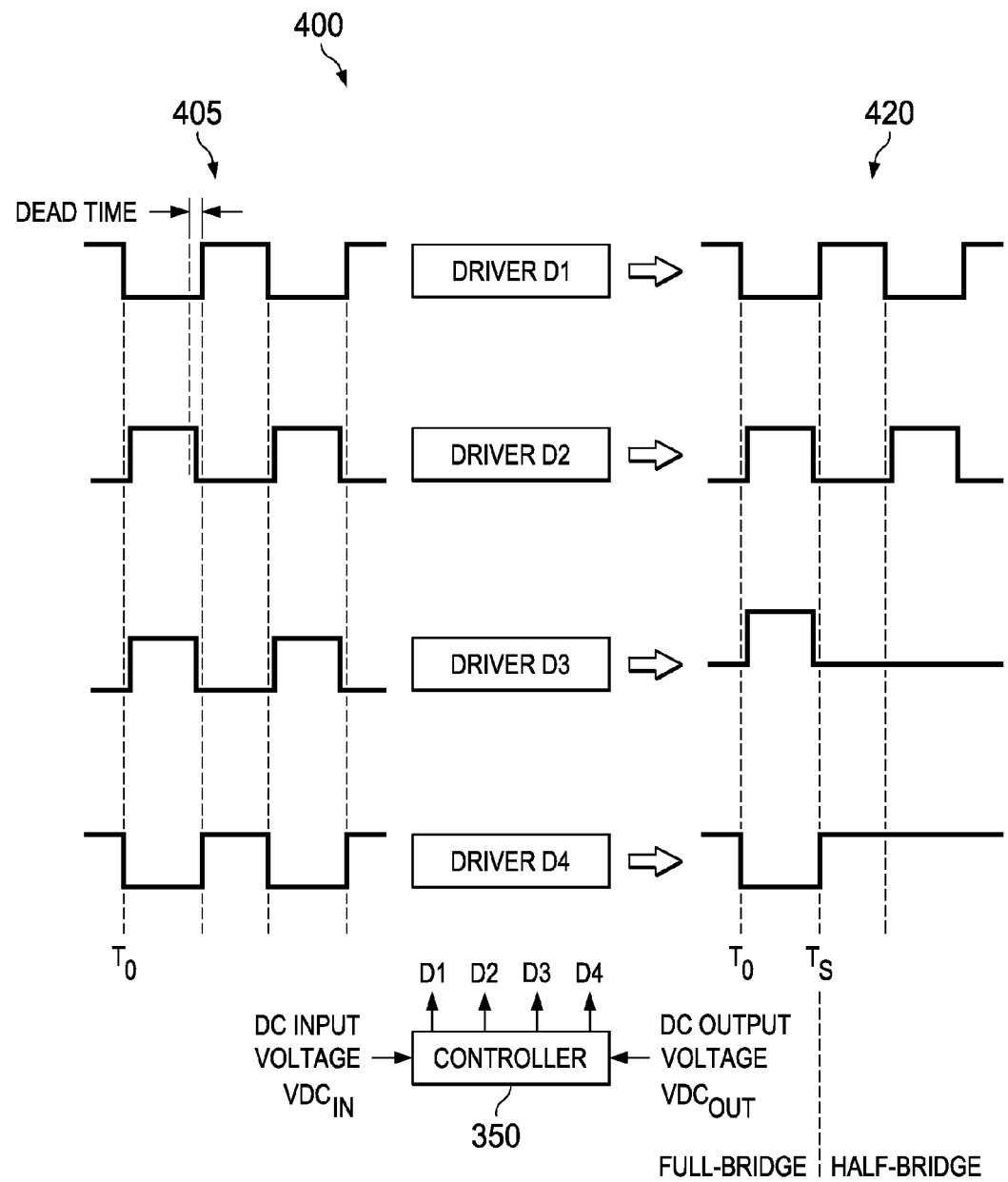
FIG. 4 illustrates a timing diagram of control signals as may be employed for the resonant power converter system of FIG. 3.

FIG. 4 illustrates a timing diagram of control signals, generally designated 400, as may be employed for the resonant power converter system 300 of FIG. 3. The timing diagram 400 includes a set of input control signals 405 that may be provided by the controller 350 to the two pairs of switch drivers D1:D4 and D2:D3 of the controlled switch network 310. The timing diagram 400 also includes a set of driver control signals 420 from the two pairs of switch drivers D1:D4 and D2:D3 that are provided to the two pairs of power switches S1:S4 and S2:S3 under full-bridge and half-bridge operating conditions of the controlled switch network 310.

The conversion of a full-bridge topology to a half-bridge may be accomplished by controlling one of the pairs of power switches S1:S4 and S2:S3 shown in FIG. 3. The set of input control signals 405 shows typical drive signals for each of the four power switches S1, S2, S3, S4. In this example, when a control signal is "HIGH", the power switch may be considered to be "ON" (i.e., conducting). When operating as a full-bridge, the timing of the signals for switch pair S1, S4 and switch pair S2, S3 is the same. Switch pair S1:S4 are both "ON" simultaneously and after S1, S4 are "OFF", switch pair S2:S3 are turned "ON" concurrently.

Note that a dead time is provided, which prevents the power switches S1, S2 and S3, S4 from conducting concurrently thereby preventing "shoot-through" or shorting of the DC input voltage $VDC_{in}$ through the power switches. The dead time is usually very small compared to the overall switching period. This switching action provides the square wave voltage to the resonant tank circuit. As previously discussed it is desirable to convert the topology from full-bridge to half-bridge or vice-versa when the external variable (i.e., the DC input voltage $VDC_{in}$) reaches a threshold value.

The controller 350 monitors the DC input voltage $VDC_{in}$ and provides a control signal to the drivers D3, D4 for the power switches S3, S4. The drive signals to the switches prior from $T_0$ to Ts correspond to a full-bridge operation. If the DC input voltage $VDC_{in}$ increases and reaches a threshold value, the controller, 350, using appropriate timing, commands the driver D3 to remain "LOW" and the driver D4 to remain "HIGH". This directs the controlled switch network 310 to function in a half-bridge topology. Of course, depending on when the threshold value is reached with respect to the timing signals, the driver D3 may remain "HIGH" and the driver D4 remain "LOW". The controller 350 may also issue signals to modify the switching frequency to insure that the resonant power converter system 300 operates correctly after the transition and that transients are minimized.

Figure 5A:
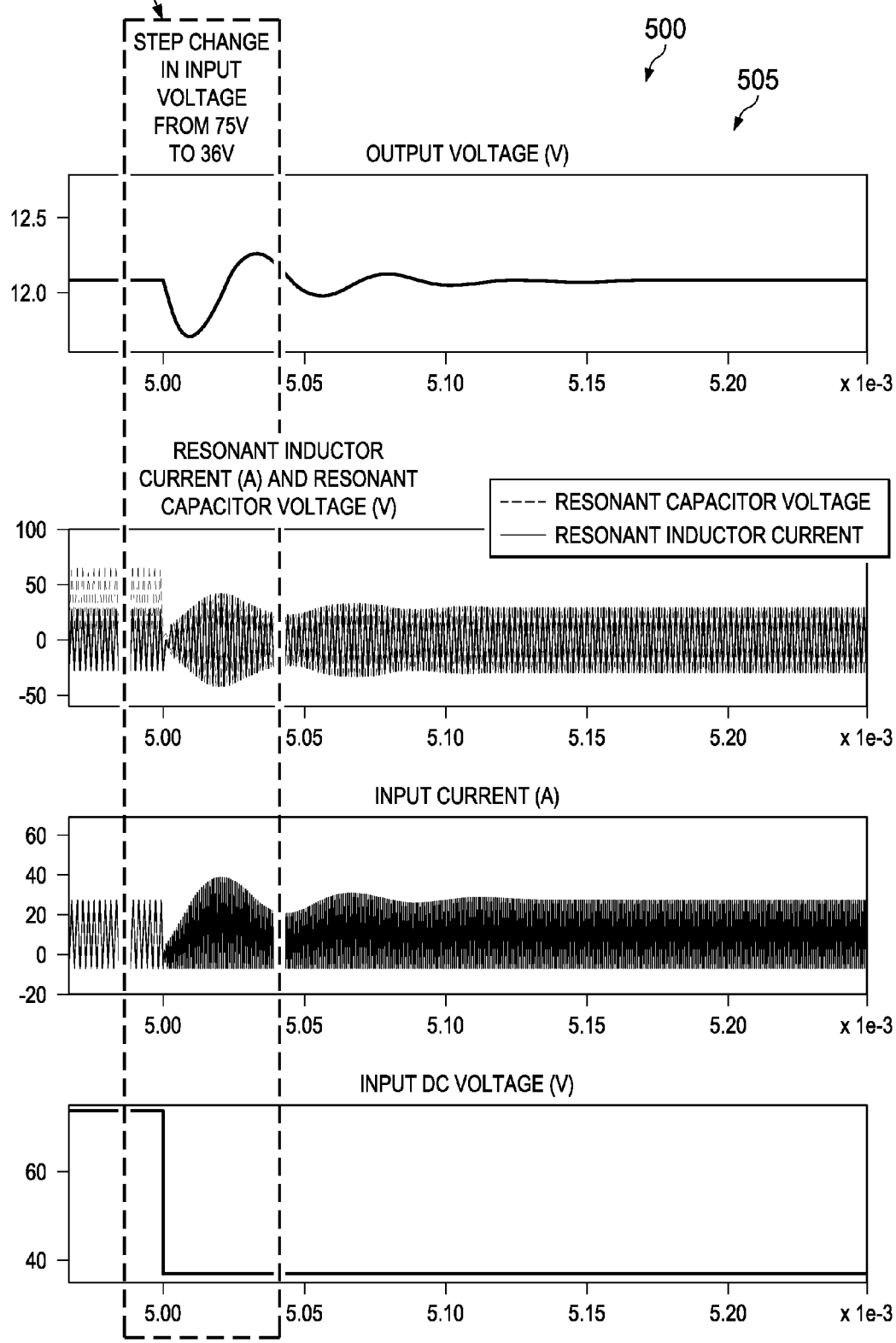
FIGS. 5 and 6 illustrate a collection of operational waveforms showing a dynamic switching example for a resonant power converter constructed according to the principles of the present disclosure.
Figure 5B:
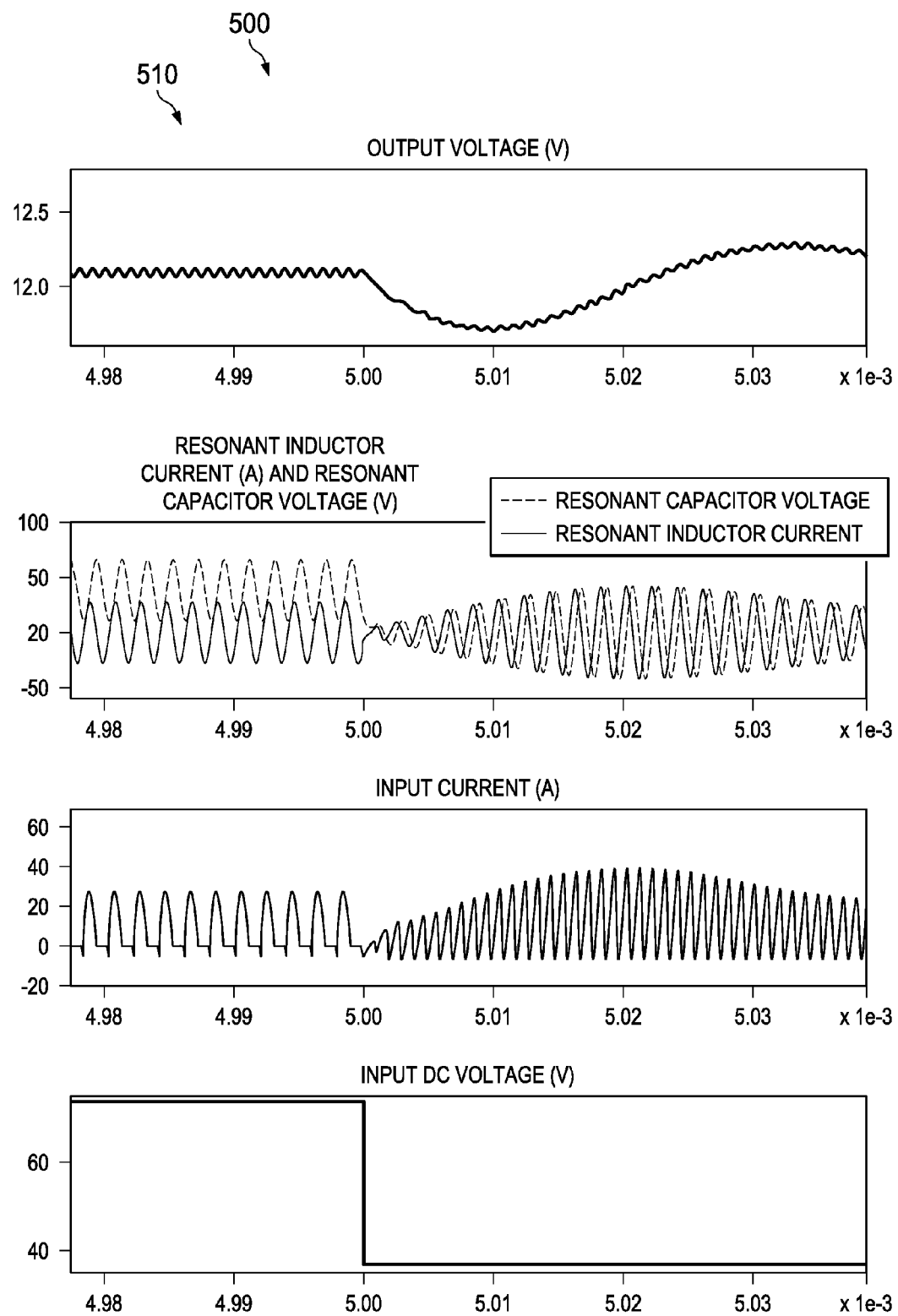
Figure 6A:
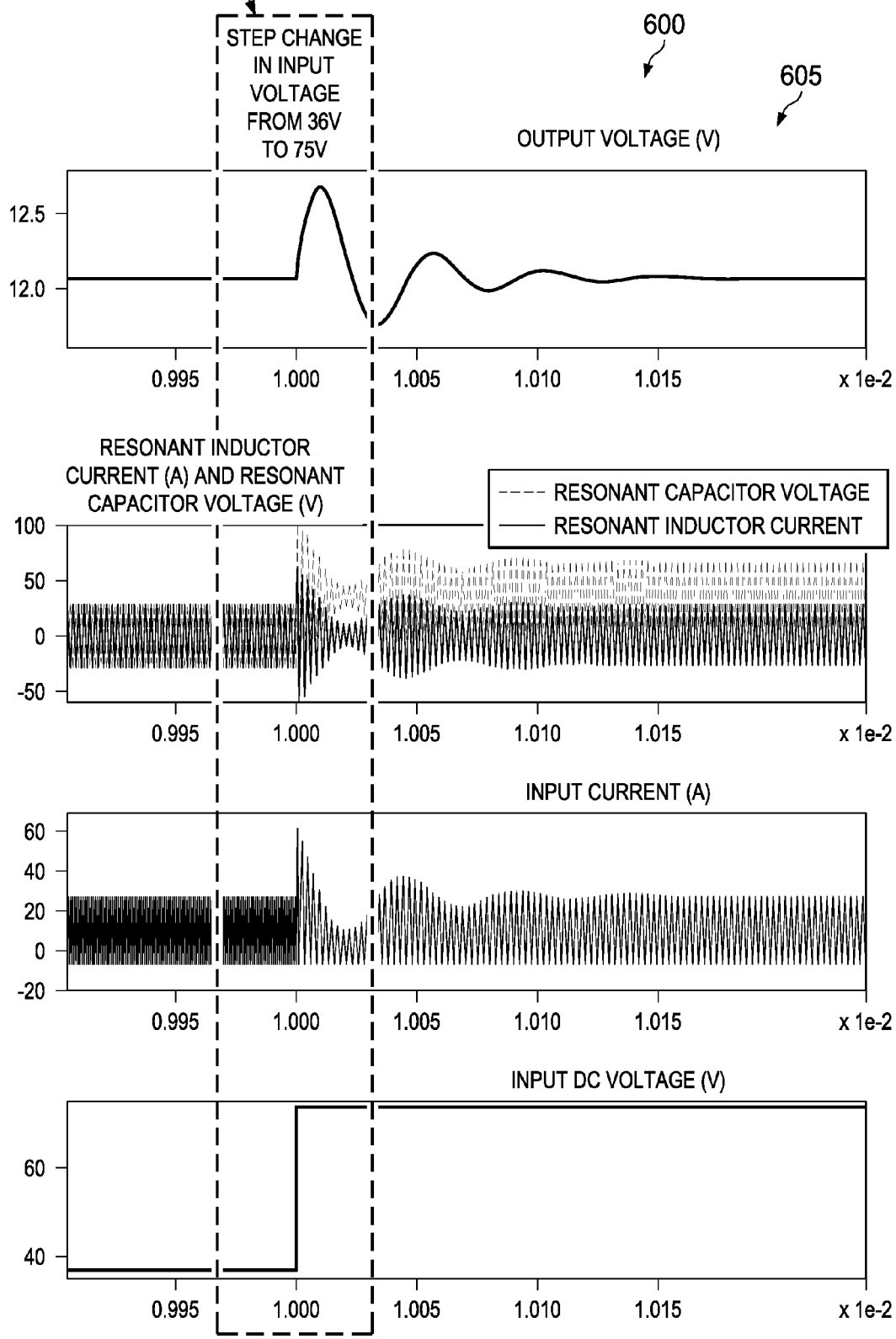
Figure 6B:
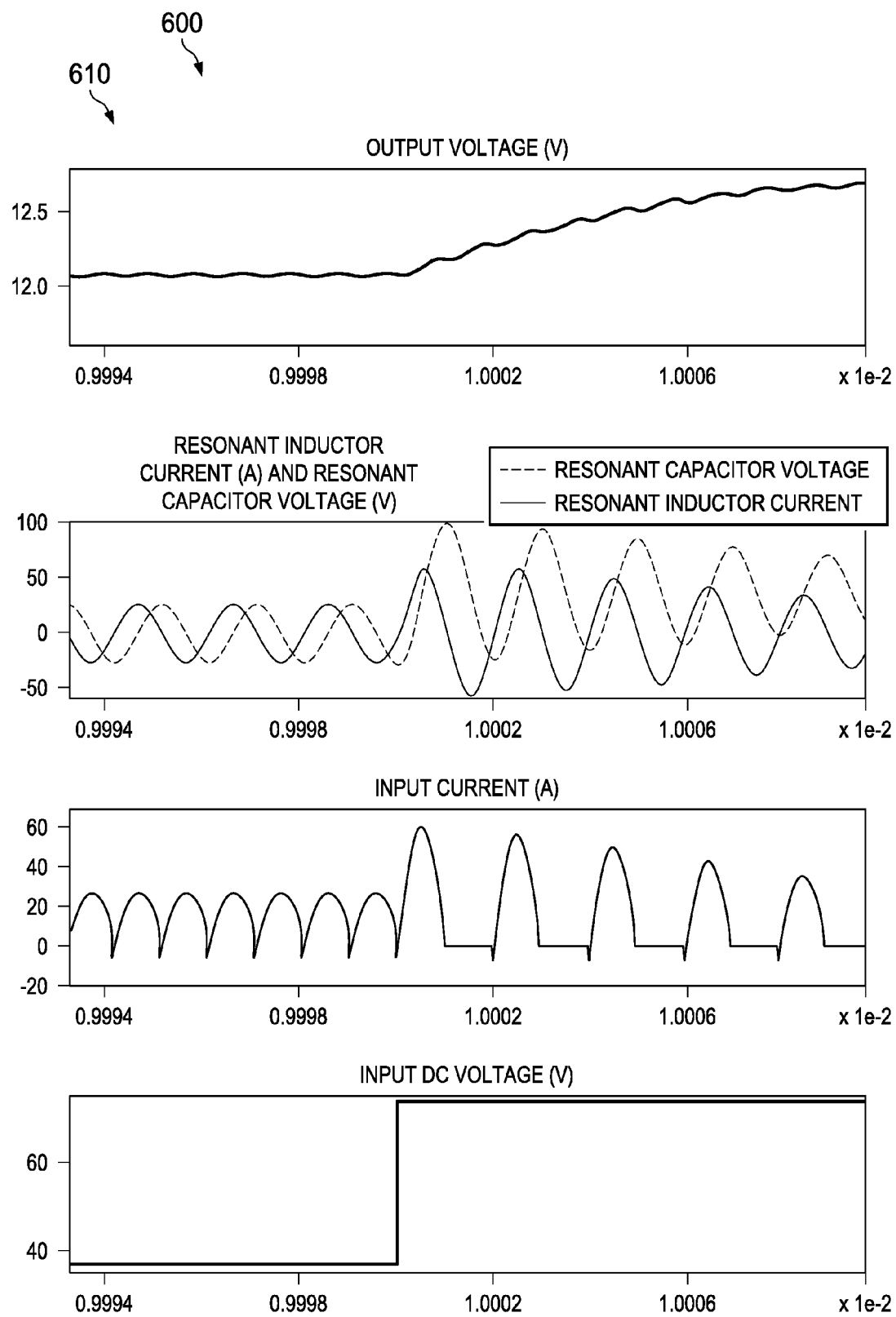

FIGS. 5 and 6 illustrate a collection of operational waveforms, generally designated 500, 600, showing a dynamic switching example for a resonant power converter constructed according to the principles of the present disclosure. In the illustrated example, the operational waveforms 500 show a DC input voltage $VDC_{in}$ of the resonant power converter that is step changed from 75 Vdc to 36 Vdc. Conversely, the operational waveforms 600 show a DC input voltage $VDC_{in}$ of the power converter that is step changed from 36 Vdc to 75 Vdc. Each of the waveforms 500, 600 shows a set of actual time waveforms 505, 605 and expanded time waveforms 510, 610. The operational waveforms 505, 510, 605, 610 show initial transients that are well behaved and subside to provide a smooth transition between half-bridge and full-bridge operating modes for these two values of dynamically switched DC input voltages.

Figure 8:
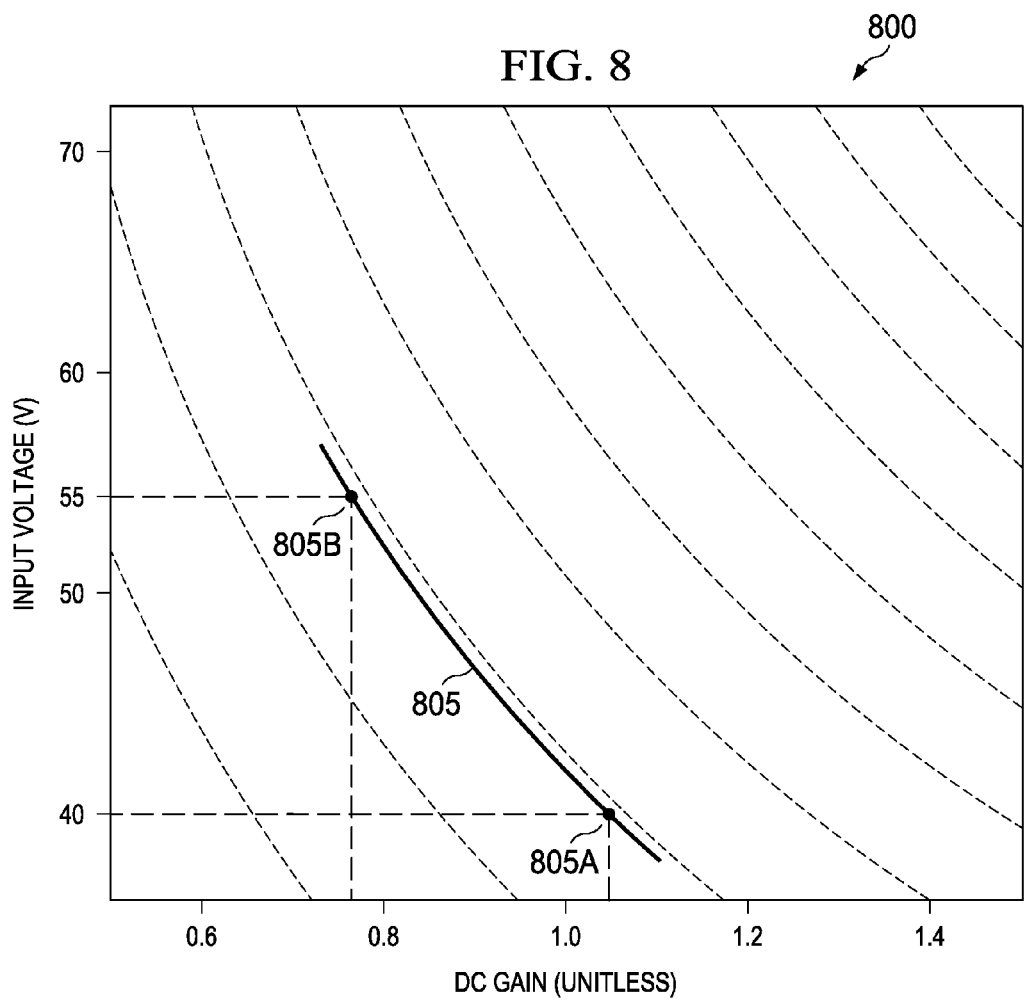

FIGS. 7 and 8 illustrate families of constant output voltages, generally designated 700, 800, for embodiments of resonant power converters employing full-bridge and half-bridge topologies, respectively. The output voltages correspond to a range of normalized gains (or switching frequencies) for a range of input voltages.

FIG. 7 includes an output voltage curve 705 that corresponds to a constant output voltage of 12 volts. First and second operating points 705A, 705B on the output voltage curve 705 define an input voltage operating range of 40 volts to 55 volts, which correspond to normalized DC gains of about 1.1 and 0.8, respectively. Similarly, FIG. 8 includes an output voltage curve 805 that corresponds to a constant output voltage of six volts. First and second operating points 805A, 805B on the output voltage curve 805 for the input voltage operating range of 40 volts to 55 volts correspond to normalized DC gains of about 1.05 and 0.76, respectively.

Figure 9:
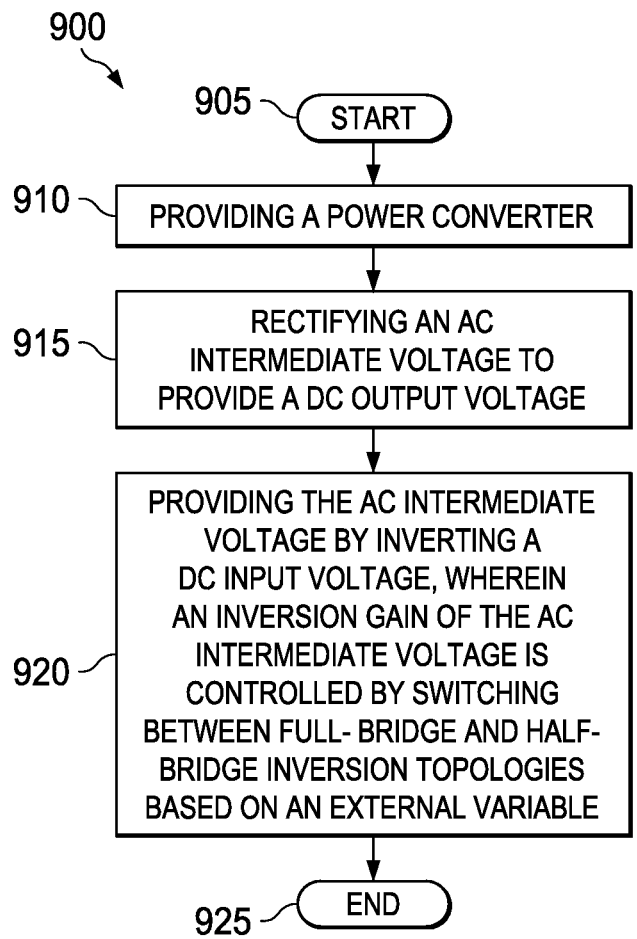
FIG. 9 illustrates a flow diagram of a method of operating a power converter carried out according to the principles of the present disclosure.

FIG. 9 illustrates a flow diagram of a method of operating a power converter, generally designated 900, carried out according to the principles of the present disclosure. The method 900 starts in a step 905, and in a step 910, a power converter is provided. Then, an AC intermediate voltage is rectified to provide a DC output voltage, in a step 915. The AC intermediate voltage is provided by inverting a DC input voltage, wherein an inversion gain of the AC intermediate voltage is controlled by switching between full-bridge and half-bridge inversion topologies based on an external variable, in a step 920.

In one embodiment, the providing includes dynamically controlling the switching between full-bridge and half-bridge inversion topologies. In another embodiment, the providing includes the inversion gain being dependent on an LLC network. In one example, the LLC network is a series LLC network. Here, the providing includes controlling the inversion gain to be a function of a control signal frequency for the AC intermediate voltage. Generally, the providing includes controlling the inversion gain to operate in a vicinity of a load independent point for the AC intermediate voltage.

In yet another embodiment, the providing includes employing at least one of the DC input voltage and the DC output voltage as the external variable. In one example, the providing includes controlling the inversion gain to maintain the DC output voltage at a substantially constant value for at least two DC input voltages. In another example, the providing includes controlling the inversion gain to maintain the DC output voltage at a substantially constant value for a range of values of the DC input voltage. Additionally, the providing includes a threshold value of the external variable determining a point of dynamically switching between full-bridge and half-bridge topologies. Also, the threshold value includes a hysteresis to inhibit spurious switching between full-bridge and half-bridge topologies. The method 900 ends in a step 925.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

What is claimed is:

1. A power converter, comprising:
   a rectifier stage configured to provide a DC output voltage from an AC intermediate voltage; and
   a resonant inverter stage configured to provide the AC intermediate voltage from a DC input voltage, wherein an inverter gain is controlled by switching between full-bridge and half-bridge topologies based on an external variable of the power converter, wherein the resonant inverter stage comprises:
      a switch network configured to provide a square AC waveform based on the DC input voltage; and
      an inductor, inductor, capacitor (LLC) resonant circuit coupled to an output of the switch network, the LLC resonant circuit configured to adjust a frequency of the square AC waveform relative to a resonant frequency of the LLC resonant circuit to control the DC output voltage, while maintaining a fixed duty cycle of the LLC resonant circuit.

2. The power converter as recited in claim 1 wherein the switching between full-bridge and half-bridge inversion topologies is controlled dynamically.

3. The power converter as recited in claim 1 wherein the external variable includes at least one of the DC input voltage and the DC output voltage.

4. The power converter as recited in claim 1 wherein the inverter gain is controlled to maintain the DC output voltage at a substantially constant value for at least two DC input voltages.

5. The power converter as recited in claim 1 wherein the inverter gain is controlled to maintain the DC output voltage at a substantially constant value for a range of values of the DC input voltage.

6. The power converter as recited in claim 1 wherein the inverter gain is a function of a control signal frequency applied to the resonant inverter stage.

7. The power converter as recited in claim 1 wherein the inverter gain is dependent on an LLC network in the resonant inverter stage.

8. The power converter as recited in claim 7 wherein the LLC network is a series LLC network.

9. The power converter as recited in claim 1 wherein a threshold value of the external variable determines a point of dynamically switching between full-bridge and half-bridge topologies.

10. The power converter as recited in claim 9 wherein the threshold value includes a hysteresis to inhibit spurious switching between full-bridge and half-bridge topologies.

11. A method of operating a power converter, comprising:
    rectifying an AC intermediate voltage to provide a DC output voltage; and
    providing the AC intermediate voltage by inverting a DC input voltage, wherein an inversion gain of the AC intermediate voltage is controlled by switching between full-bridge and half-bridge inversion topologies based on an external variable, wherein providing the AC intermediate voltage comprises:
       generating, by a switch network, a square AC waveform based on a DC input voltage; and
       adjusting, by a LLC resonant circuit coupled to an output of the switch network, a frequency of the square AC waveform relative to a resonant frequency of the LLC resonant circuit to control the DC output voltage, while maintaining a fixed duty cycle of the LLC resonant circuit.

12. The method as recited in claim 11 wherein the providing includes dynamically controlling the switching between full-bridge and half-bridge inversion topologies.

13. The method as recited in claim 11 wherein the providing includes employing at least one of the DC input voltage and the DC output voltage as the external variable.

14. The method as recited in claim 11 wherein the providing includes controlling the inversion gain to maintain the DC output voltage at a substantially constant value for at least two DC input voltages.

15. The method as recited in claim 11 wherein the providing includes controlling the inversion gain to maintain the DC output voltage at a substantially constant value for a range of values of the DC input voltage.

16. The method as recited in claim 11 wherein the providing includes controlling the inversion gain to be a function of a control signal frequency for the AC intermediate voltage.

17. The method as recited in claim 11 wherein the providing includes the inversion gain being dependent on an LLC network.

18. The method as recited in claim 17 wherein the LLC network is a series LLC network.

19. The method as recited in claim 11 wherein the providing includes a threshold value of the external variable determining a point of dynamically switching between full-bridge and half-bridge topologies.

20. The method as recited in claim 19 wherein the threshold value includes a hysteresis to inhibit spurious switching between full-bridge and half-bridge topologies.

21. A resonant power converter system, comprising:
   an output load;
   a rectifier stage that provides a DC output voltage to the output load from an AC intermediate voltage;
   a resonant inverter stage that provides the AC intermediate voltage from a DC input voltage, wherein an inverter gain is controlled by switching between full-bridge and half-bridge topologies based on an external variable of the resonant power converter system, wherein the resonant inverter stage comprises:
      a switch network configured to provide a square AC waveform based on the DC input voltage; and
      an inductor, inductor, capacitor (LLC) resonant circuit coupled to an output of the switch network, the LLC resonant circuit configured to adjust a frequency of the square AC waveform relative to a resonant frequency of the LLC resonant circuit to control the DC output voltage, while maintaining a fixed duty cycle of the LLC resonant circuit; and
   a controller that controls the resonant power converter system.

22. The system as recited in claim 21 wherein the switching between full-bridge and half-bridge inversion topologies is controlled dynamically.

23. The system as recited in claim 21 wherein the external variable includes at least one of the DC input voltage and the DC output voltage.

24. The system as recited in claim 21 wherein the inverter gain is controlled to maintain the DC output voltage at a substantially constant value for at least two DC input voltages.

25. The system as recited in claim 21 wherein the inverter gain is controlled to maintain the DC output voltage at a substantially constant value over a range of values of the DC input voltage.

26. The system as recited in claim 21 wherein the inverter gain is a function of a control signal frequency applied to the resonant inverter stage.

27. The system as recited in claim 21 wherein the inverter gain is dependent on an LLC network in the resonant inverter stage.

28. The system as recited in claim 27 wherein the LLC network is a series LLC network.

29. The system as recited in claim 21 wherein a threshold value of the external variable determines a point of dynamically switching between full-bridge and half-bridge topologies.

30. The system as recited in claim 29 wherein the threshold value includes a hysteresis to inhibit spurious switching between full-bridge and half-bridge topologies.

* * * * *